April 7, 1953
H. A. AMMAN
2,633,648
RADAR TRAINING DEVICE
Filed Feb. 20, 1950
8 Sheets-Sheet 1
Fig. 1.
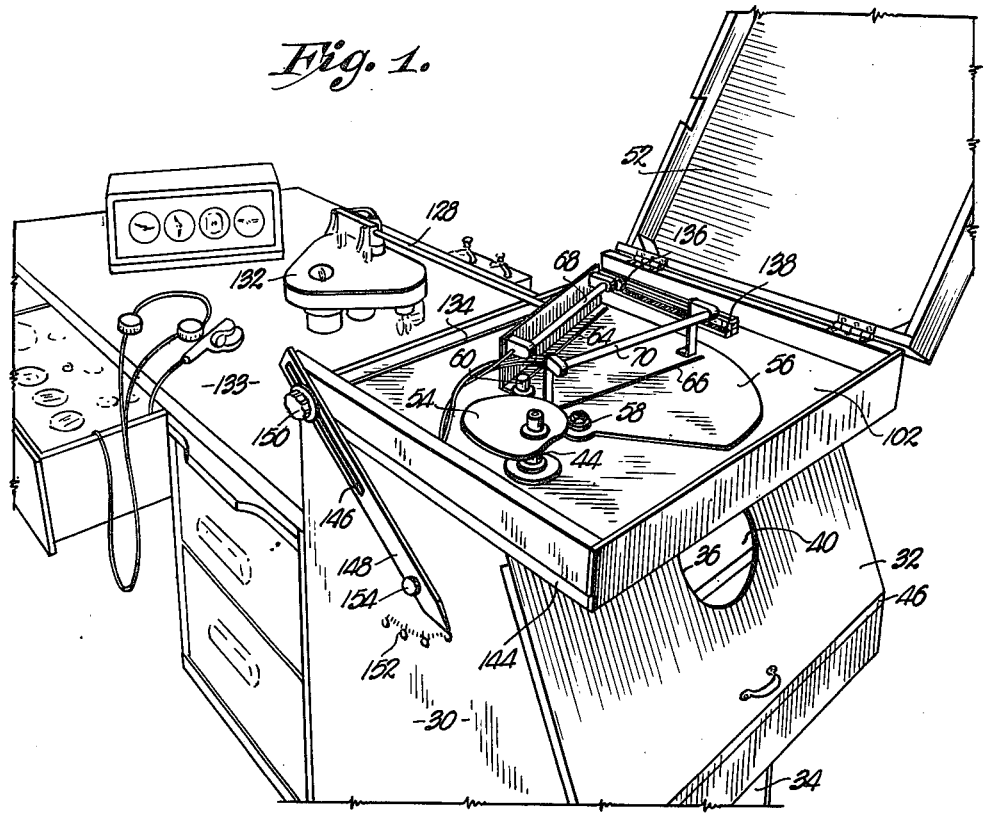
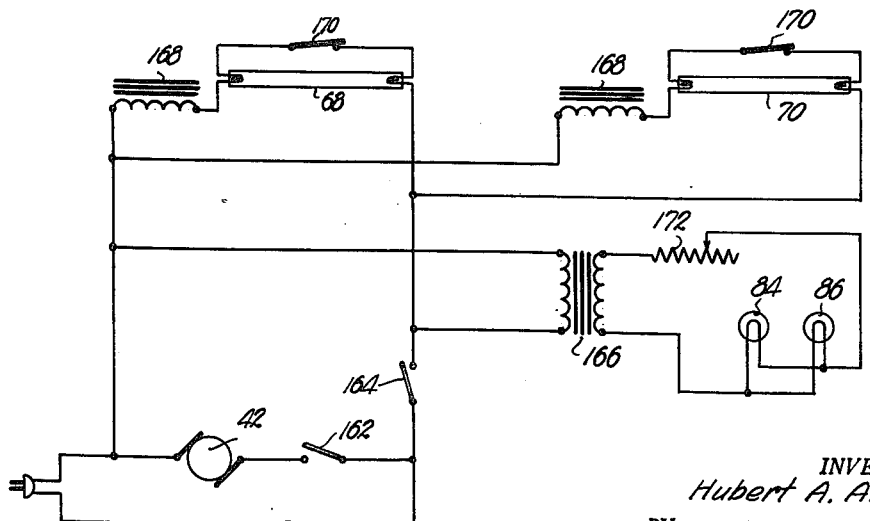
Fig. 8.
INVENTOR.
Hubert A. Amman
BY
ATTORNEY.

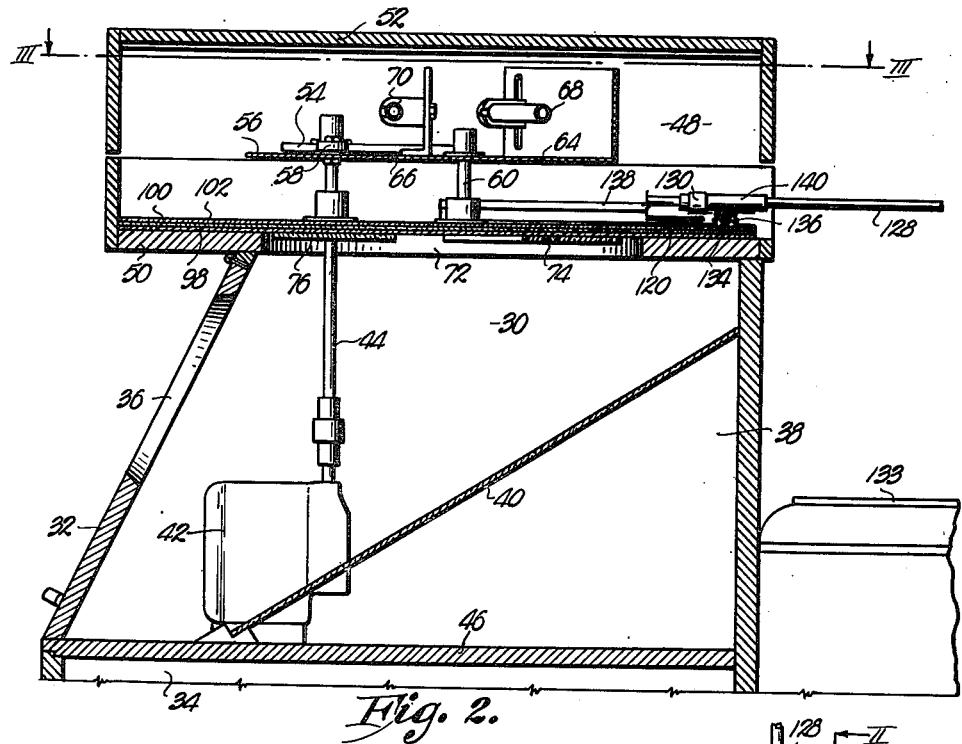

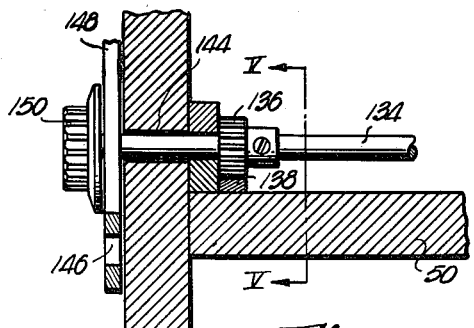
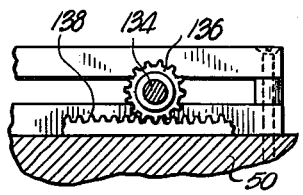
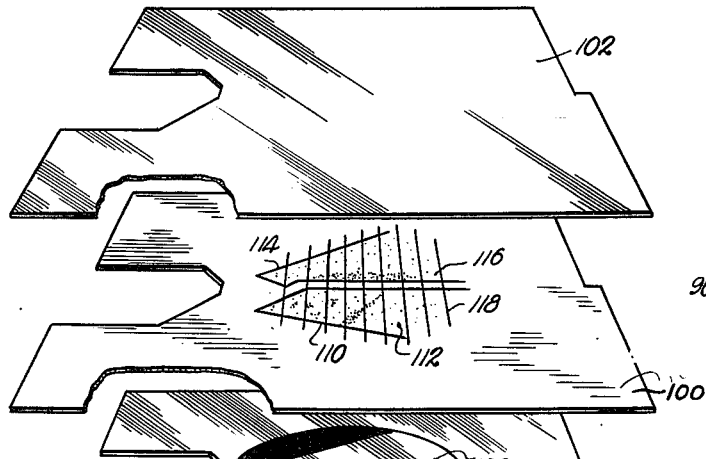
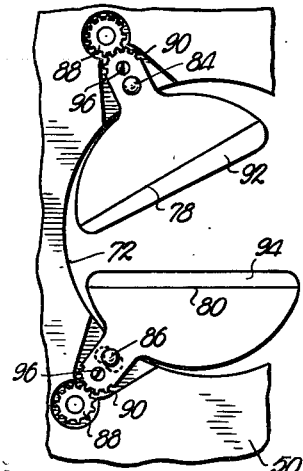
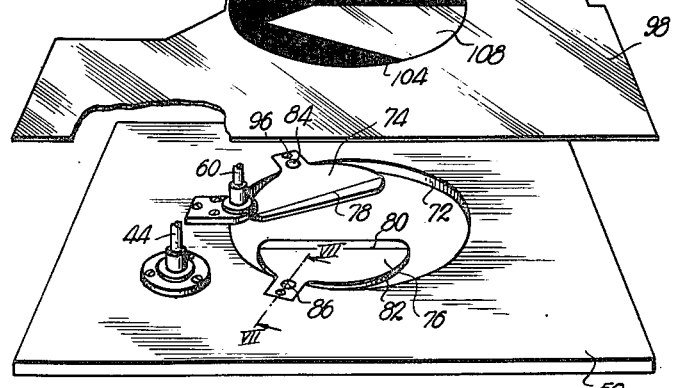
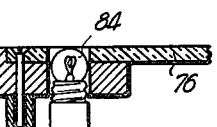

April 7, 1953　　　　　H. A. AMMAN　　　　2,633,648
RADAR TRAINING DEVICE

Filed Feb. 20, 1950　　　　　　　　　　8 Sheets-Sheet 4

INVENTOR.
Hubert A. Amman
BY
ATTORNEY.

April 7, 1953 H. A. AMMAN 2,633,648
RADAR TRAINING DEVICE
Filed Feb. 20, 1950 8 Sheets-Sheet 5
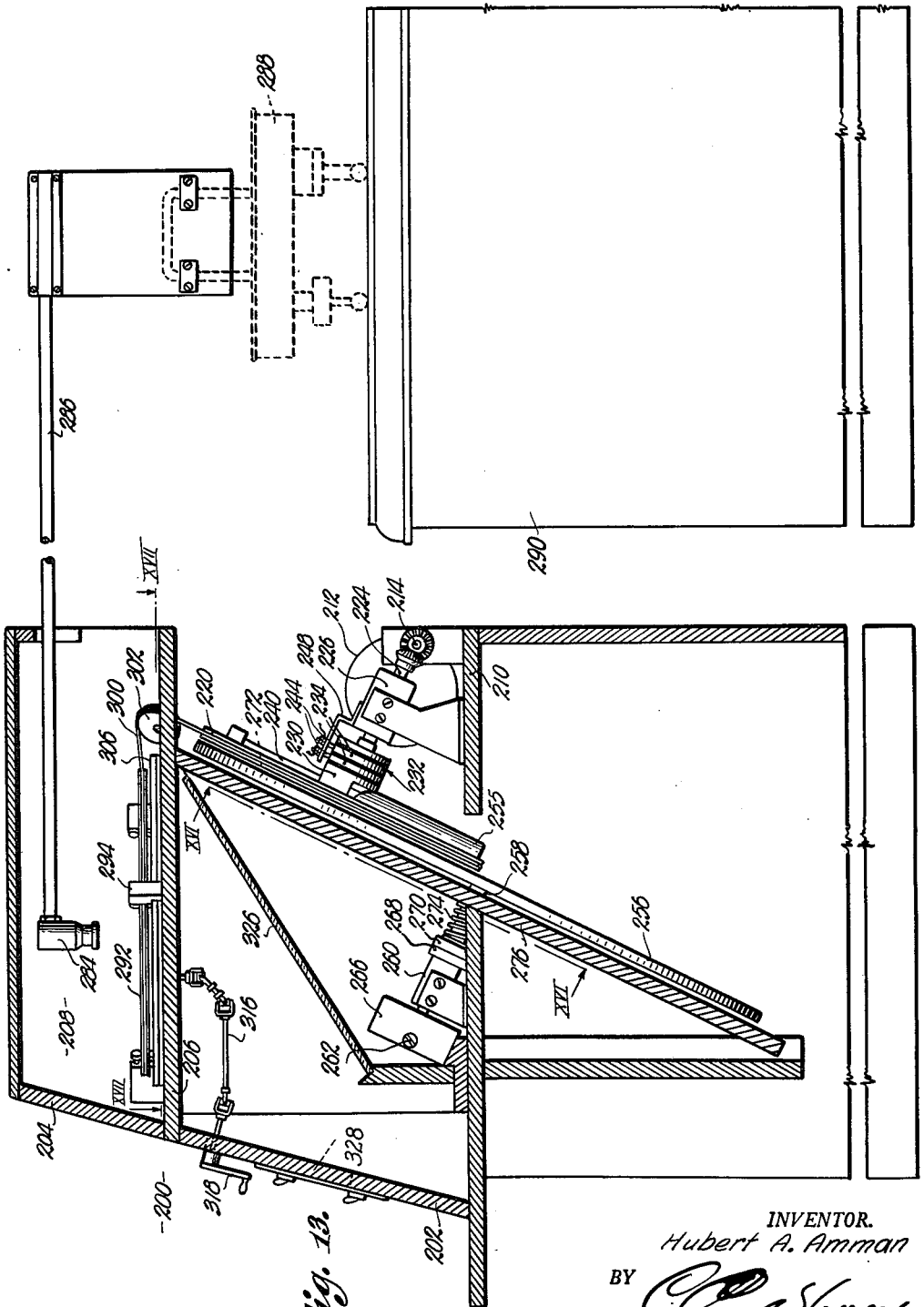
INVENTOR.
Hubert A. Amman
BY
ATTORNEY.

April 7, 1953  H. A. AMMAN  2,633,648
RADAR TRAINING DEVICE
Filed Feb. 20, 1950  8 Sheets-Sheet 6

INVENTOR.
Hubert A. Amman
BY
ATTORNEY.

April 7, 1953 H. A. AMMAN 2,633,648
RADAR TRAINING DEVICE
Filed Feb. 20, 1950 8 Sheets-Sheet 7

INVENTOR.
Hubert A. Amman
BY
ATTORNEY

April 7, 1953 H. A. AMMAN 2,633,648
RADAR TRAINING DEVICE
Filed Feb. 20, 1950 8 Sheets-Sheet 8
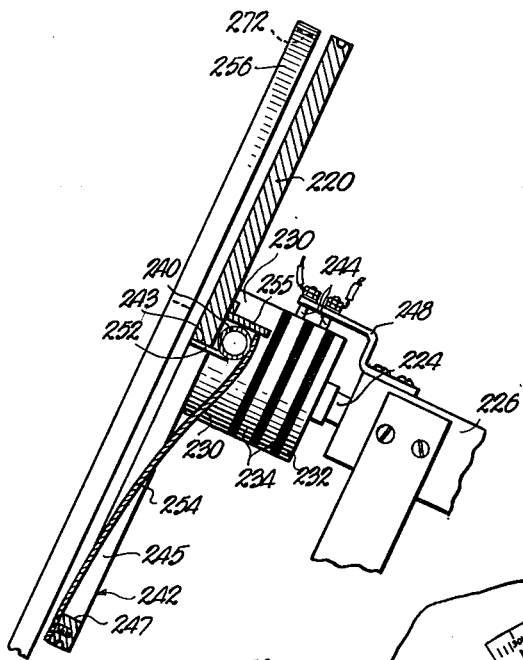
Fig. 19.
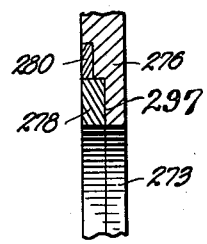
Fig. 21.
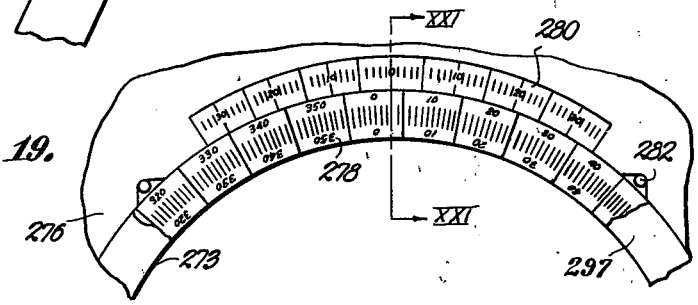
Fig. 20.
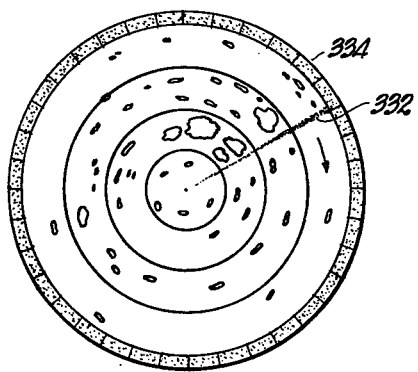
Fig. 23.
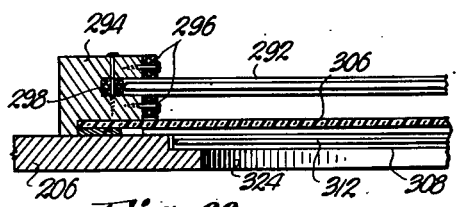
Fig. 22.
INVENTOR.
Hubert A. Amman
BY
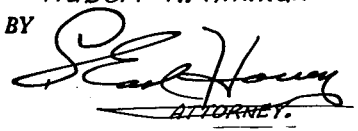
ATTORNEY.

Patented Apr. 7, 1953

2,633,648

UNITED STATES PATENT OFFICE 2,633,648

RADAR TRAINING DEVICE

Hubert A. Amman, Kansas City, Mo.

Application February 20, 1950, Serial No. 145,135

11 Claims. (Cl. 35—10.4)

This invention relates to apparatus for the training of personnel in the use of radio detection and ranging equipment as applied to aircraft and marine service. It is well known that considerable training and practice is required to give the observer of a radar indication proficiency in evaluating the information depicted thereon and in utilizing that information to issue directions to the pilots when guidance from the ground is required because of emergency or adverse weather conditions. Sufficient training cannot be obtained under conditions of actual use because of the time, expense, and hazards involved in making flights, for instance, where the purpose of such training is to give a student an opportunity to observe the radar scope indications and to give trial directions to the pilot.

Manifestly, the provision of training apparatus which will simulate the radar scope indications is important to the correct and successful operation of radar equipment, operating under actual conditions.

One of the most important objects of this invention, therefore, is to provide training apparatus capable of producing a simulated radar scope presentation having stationary and moving patterns controllable to meet the training problems presented.

Another important object of this invention is to provide radar training apparatus having means to produce a simulated cathode-ray tube screen presentation having thereon range lines, ground obstructions, markings and other stationary patterns that ordinarily appear as a part of the indication on a radar screen.

A primary aim of this invention is to provide radar training apparatus having a simulated cathode-ray tube presentation having superimposed thereon a movable pattern which in turn has its speed and direction of travel controlled remotely or in connection with other training apparatus, thus making possible the production of a predetermined training problem to be worked out by the student thereby furnishing an accurate determination of the trainer's proficiency in the use of radar equipment.

Another object of this invention is to provide radar training apparatus capable of making possible an efficient and continuous training program which may be conducted without hazard and at a minimum of time and expense.

A further object of this invention is to provide radar training apparatus for simulating the presentation on a radar scope through use of simplified optical and mechanical equipment to eliminate the need for complicated electronic devices and the maintenance problem attendant thereto.

In the drawings:

Figure 1 is a fragmentary perspective view of one form of radar training device made in accordance with the present invention.

Fig. 2 is a cross-sectional view taken on irregular line II—II of Fig. 3.

Fig. 3 is a cross-sectional view taken on line III—III of Fig. 2.

Fig. 4 is an enlarged, fragmentary, detailed, cross-sectional view taken on line IV—IV of Fig. 3.

Fig. 5 an enlarged, fragmentary, detailed, cross-sectional view taken on line V—V of Fig. 4.

Fig. 6 is a stretched out, perspective view of the image producing panel assembly per se.

Fig. 7 is an enlarged, detailed, fragmentary, cross-sectional view taken on line VII—VII of Fig. 6.

Fig. 8 is a wiring diagram showing the electrical system of the trainer.

Figure 9:
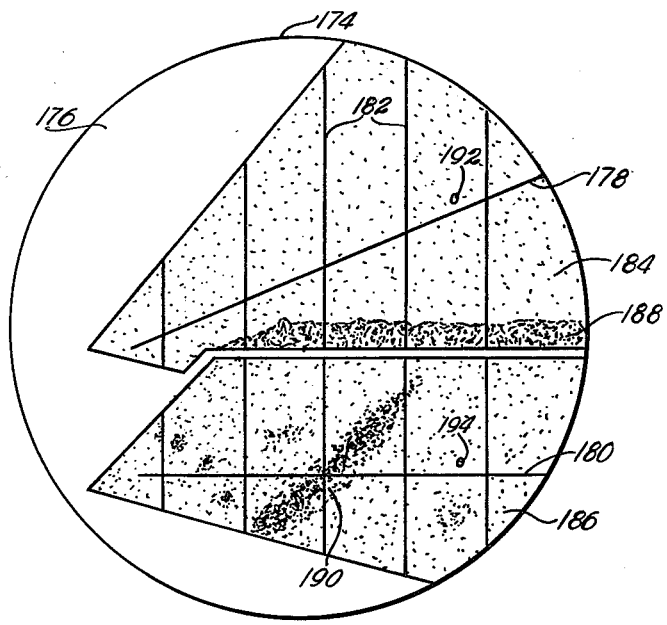

Fig. 9 is a plan view of a presentation made possible through use of the trainer.

Fig. 10 is a top plan view of a slightly modified form of cursor line producing structure.

Figures 11, 12:
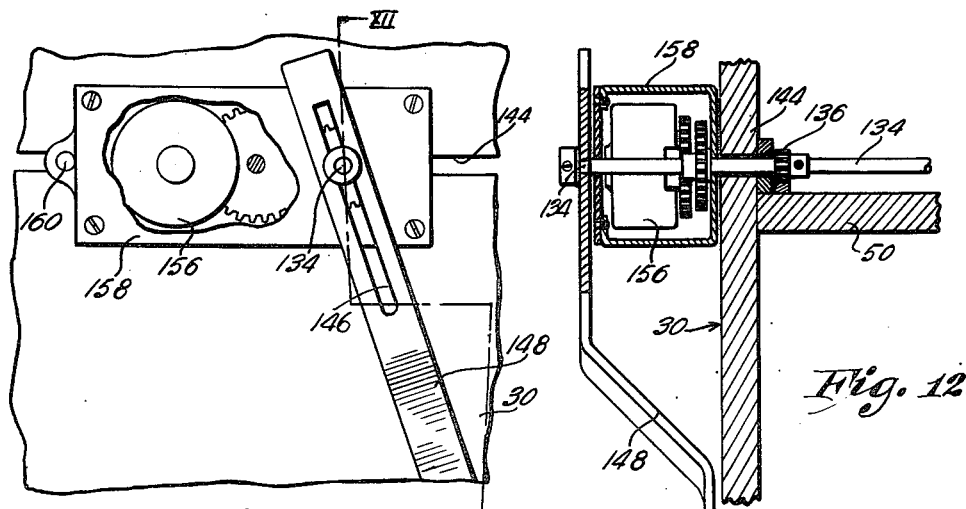

Fig. 11 is a fragmentary side elevational view, parts being broken away, showing a modified form of moving target control means.

Fig. 12 is a cross-sectional view taken on irregular line XII—XII of Fig. 11.

Figure 13:
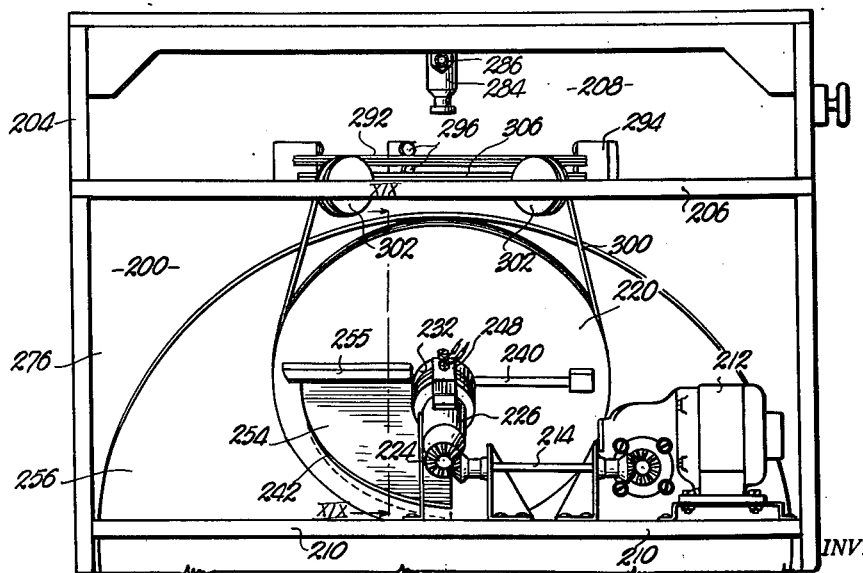

Fig. 13 is a substantially central vertical cross-sectional view showing a modification of the trainer.

Figure 14:
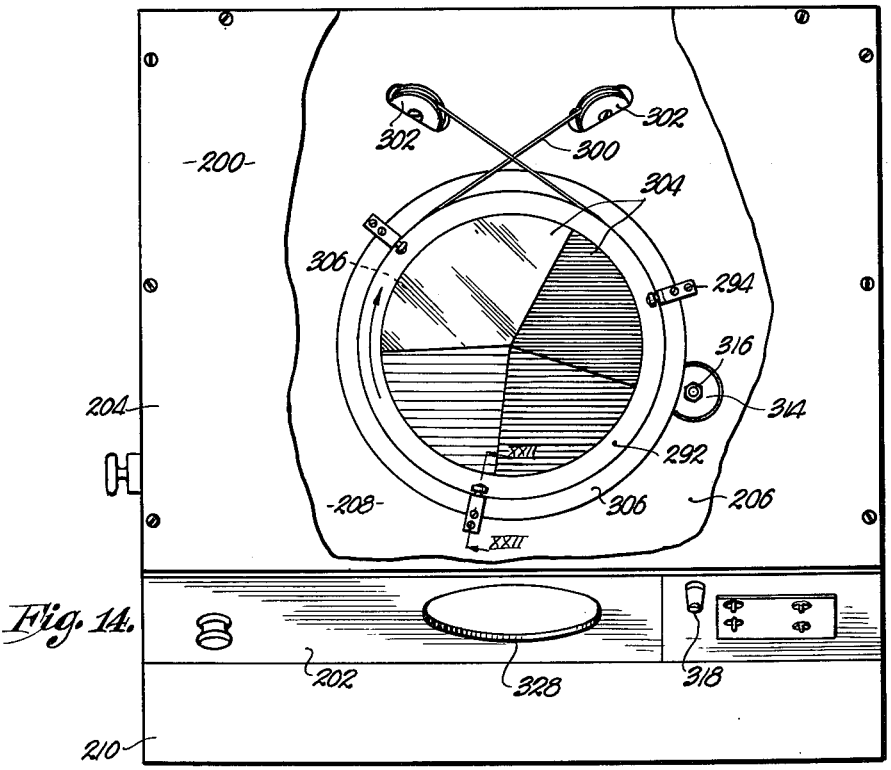

Fig. 14 is a top plan view thereof, parts being broken away for clearness.

Fig. 15 is a fragmentary rear elevational view thereof.

Figure 16:
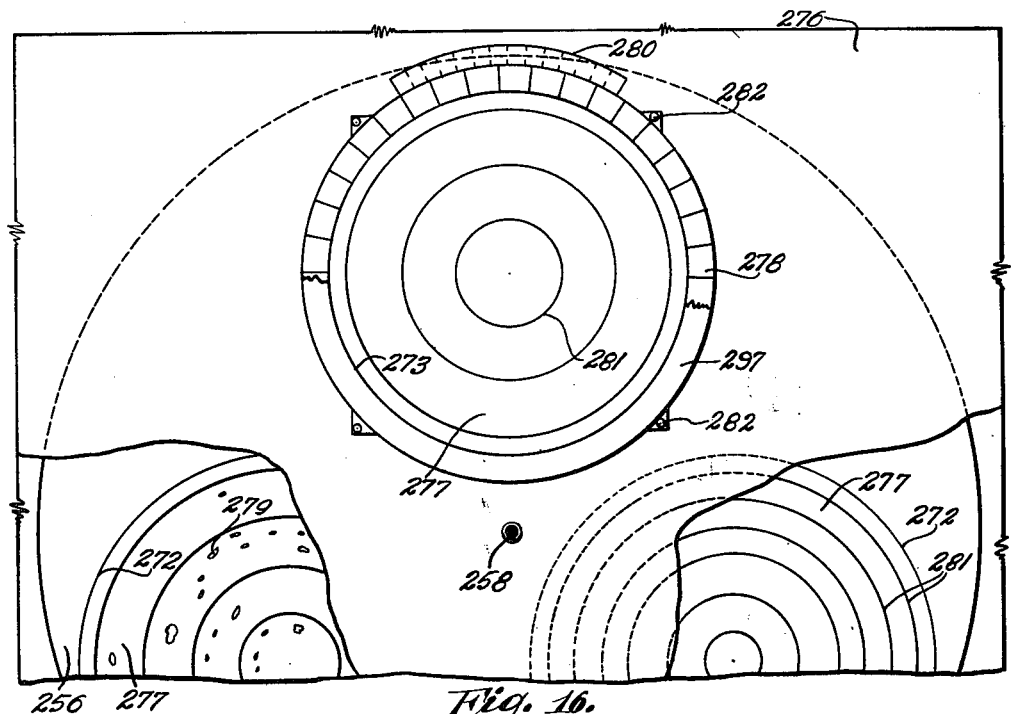

Fig. 16 is a fragmentary, cross-sectional view taken on line XVI—XVI of Fig. 13, parts being broken away to reveal details of construction.

Figure 17:
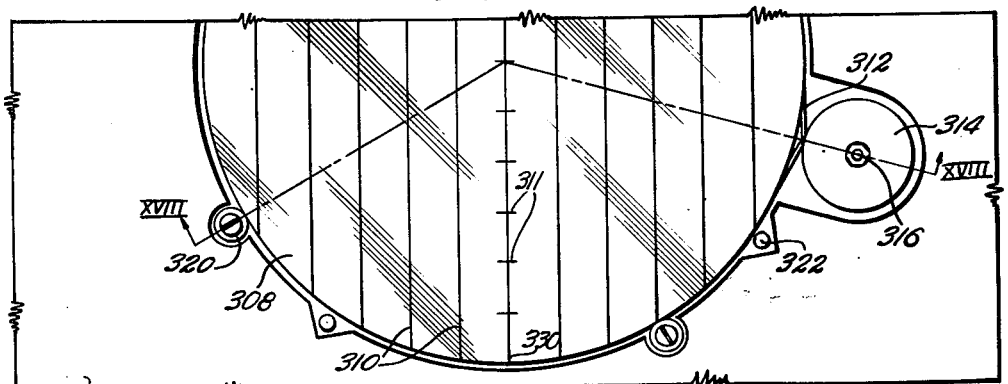

Fig. 17 is a fragmentary, cross-sectional view taken on line XVII—XVII of Fig. 13.

Figure 18:
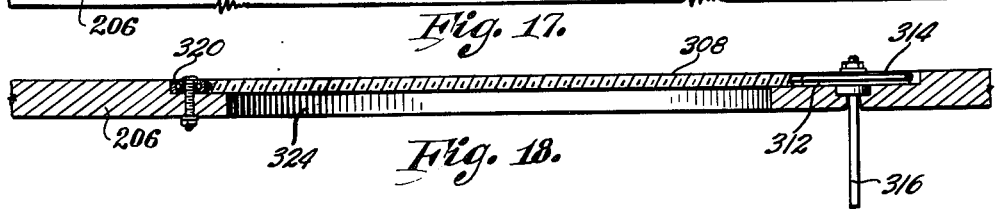

Fig. 18 is a cross-sectional view taken on line XVIII—XVIII of Fig. 17.

Fig. 19 is a cross-sectional view taken on line XIX—XIX of Fig. 15.

Fig. 20 is a fragmentary top plan view showing the navigating head ring assembly.

Fig. 21 is a cross-sectional view taken on line XXI—XXI of Fig. 20.

Fig. 22 is a fragmentary, cross-sectional view taken on line XXII—XXII of Fig. 14; and Fig. 23 is a plan view of a presentation made possible through use of the modification of Figs. 13 to 22 inclusive.

Those skilled in the field are familiar with operation of radio detection and ranging apparatus, hereinafter referred to by the well-known, coined term "radar" and therefore, a brief description only is necessary to understand the present invention, its operation and objectives to properly train students in reading images that are translated upon the face of a cathode ray tube or "scope" of radar equipment, such images should be simulated as closely as possible in any training device. It is not only important that the student learn to recognize reflected objects by their particular shapes, but by the brilliances thereof, it being known that certain objects appear as bright spots while other objects are non-reflecting and therefore, appear as dark areas on the scope.

Depending upon the particular radar scope presentation, the luminous scanning line that is observed on the scope should also become familiar to the student. In the plan position indicator type of radar, the antenna rotates 360 degrees to scan the target terrain whereas in azimuth-elevation presentation as used in the precision approach system, oscillatory motion is imparted to the antenna.

This invention contemplates therefore, presenting to the student the "sweep" or luminescent line that is formed on the radar scope, irrespective of the "scan" or area in space covered by the moving radar antenna.

Another important consideration is the peculiar manner in which bright areas on the radar scope, reproduced by radio wave reflecting objects within the area scanned, are brightest following the sweep, with a gradual fading as the antenna continues to move. It will be seen that this effect is presented to the student in each presentation made possible through use of the present invention.

Finally, in conjunction with the above factors and others, this invention contemplates presenting moving targets as the same appear on the scope with the result that full training in traffic control and landing may be given the student in close simulation to actual conditions to be experienced when confronted with airport procedures.

Manifestly, training devices must vary with the form of the radar signals on the cathode ray screen, and therefore, one modification of my invention as illustrated in Figs. 1 to 12 inclusive, shows one form of device for use in training when azimuth-elevation (AZ-EL) presentation is produced by the radar sweep circuit.

A suitable cabinet broadly designated by the numeral 30 (Figs. 1–3) is designed for convenience in use with an inclined front wall 32, below which is provided a space 34 for receiving the legs of a student as he is seated in a position to look through an opening 36. The diameter of opening 36 in wall 32 is preferably the same as that of the conventional radar screen, and wall 32 is hingedly mounted to render compartment 38 accessible.

Compartment 38 houses an inclined reflector 40 that may constitute a conventional mirror or polished metal, as well as an electric motor 42 connected with a vertical drive shaft 44 and mounted on horizontal partition 46. Compartment 38 and space 34 of cabinet 30 are divided by partition 46 (Figs. 1 and 2), and a chamber 48 has an opaque bottom wall 50 that comprises the top of compartment 38. Chamber 48 is rendered substantially light-proof by a hingedly mounted lid 52.

A cam 54, having the shape of a cardioid and rigid to shaft 44, oscillates an opaque scanning plate 56 through contact with a roller 58 on plate 56. Both cam 54 and plate 56 are spaced above wall 50, and an upstanding stub shaft 60, spaced from shaft 44 and roller 58, pivotally supports plate 56.

Roller 58 of oscillating plate 56 is held biased against the periphery of cam 54 by a spring 62. (Fig. 3.) A pair of elongated base-line slots 64 and 66 in plate 56 converge as that end of plate 56 adjacent cam 54 is approached, there being elongated lamps 68 and 70 respectively for slots 64 and 66 in direct alignment thereabove. Lamps 68 and 70 of the kind capable of emitting ultra-violet rays are secured directly to plate 56 for movement therewith and coupled in the electric circuit as shown in Fig. 8, hereinafter described.

An opening 72 in wall 50 (Figs. 2 and 6), directly below plate 56 has a diameter equal to that of opening 36. Elevation and azimuth cursor plates are provided and designated by the numerals 74 and 76 respectively. (Fig. 6.) These spaced, semi-circular transparent plates 74 and 76, extending into opening 72, are secured to wall 50 and are provided on one face thereof with scored lines 78 and 80 respectively, that converge in the same direction and angularity as slots 64 and 66. A suitable opaque covering 82 is provided on the peripheral edges of plates 74 and 76 and small incandescent lamps 84 and 86 extend into plates 74 and 76 respectively in the manner shown by Fig. 7.

The angularity of lines 78 and 80 may be varied by providing modified structure illustrated in Fig. 10 wherein remotely controlled rotatable gears 88 engage teeth 90 on plates 92 and 94 that are pivotally mounted as at 96.

A number of superimposed panels 98, 100 and 102 (Fig. 6) are removably mounted in chamber 48 above wall 50, panel 102 being fully transparent and serving as a protecting covering. Panel 98 is also fully transparent except for a circular area directly above opening 72 having an opaque portion 104, produced by a dark paint coating or by other known methods, and formed to outline elevation and azimuth scanning areas 106 and 108 respectively.

Filter panel 100 is of amber colored, transparent material and has a mask painted thereon, through use of a suitable luminescent lacquer or other material, including a radar picture of an airport approach zone. A lower or azimuth scope 110 corresponding to and disposed directly above area 108 has ground clutter, non-moving targets and obstructions 112 in plan as they appear on a radar screen while an upper or elevation scope 114 has such ground clutter and obstructions, etc. in elevation and exaggerated in size as at 116. The mask on panel 100 also includes range lines 118.

Target producing structure includes an elevation bar 120 of transparent material and a similar azimuth bar 122 provided with small, elongated luminous patches 124 and 126 respectively. (Fig. 3.) Spaced, angularly disposed bars 120 and 122 are carried on a rod 128 by slips 130 and are caused to slide on panel 102 below plate 56 by a crab 132. (Fig. 1.) Crab 132 forms a part of conventional training apparatus, carried by instructor's desk 133 in the usual manner and is joined directly to rod 128 for causing azimuth changes in the target formed by patches 124 and 126.

Changes in altitude are controlled partially by a shaft 134 having spaced gears 136 on opposed racks 138 mounted in chamber 48. (Figs. 1, 3, 4, 5 and 12.) A sleeve 140 slidable on rod 128 has a transverse, semi-circular guide 142 slidable on shaft 134. Note that bar 120 is carried by sleeve 140 while bar 122 is clipped to rod 128.

One end of shaft 134 extends through a slot 144 in cabinet 30 and through a slot 146 in a pointer arm 148. (Figs. 1 and 11.) Manual rotation of shaft 134 is caused by manipulation of knob 150 on shaft 134, and pointer 148 is releasably held in an adjusted position relative to scale 152 by pivotal bolt 154.

Remote control of shaft 134 may be provided as shown in the modified form of Figs. 11 and 12, wherein is included a selsyn type electric motor 156 geared to shaft 134. Rotation of housing 158 for motor 156 is prevented by guide 160 riding in slot 144.

Fig. 8 clarifies the electrical coupling of the device, showing motor 42 with a control switch 162, lamps 68, 70, 84 and 86 with a control switch 164, a transformer 166 for reducing voltage to lamps 84 and 86, ballasts 168 and starter 170 for lamps 68 and 70, and a rheostat 172 for dimming lamps 84 and 86 as required.

Assuming switches 162 and 164 to be closed, crab 132 in movement and lid 52 closed, operation is as follows:

Continued rotation of shaft 44 by motor 42 rotates cam 54 to oscillate plate 56. Simultaneously, crab 132 reciprocates rod 128 in sleeve 140 and slides guide 142 on shaft 134 to slide bars 120 and 122 across panel 102 below plate 56 and above opening 72. Bar 120 is additionally adjusted manually by loosening bolt 154 and rotating knob 150 to move shaft 134 along racks 138.

Rays of light emanating from oscillating lamps 68 and 70 and passing through slots 64 and 66 illuminate luminous patches 124 and 126 and also pass through panels 102, 100 and 98. Such rays are filtered by panel 100 and illuminate luminous range lines 118, patterns 112 and 116 and scopes 110 and 114.

The light rays are blocked by mask 104 but pass freely through transparent areas 106 and 108 to reflector 40 via opening 72. Lamps 84 and 86 illuminate lines 78 and 80 respectively.

The resulting picture is shown in Fig. 9 as it appears on reflector 40 and as seen through opening 36 with reflector 40 properly adjusted. The outline of opening 72 and of mask 104 is designated by the numeral 174, with the image of mask 104 designated by the numeral 176. Cursor lines are shown at 178 and 180 as images of lines 78 and 80 respectively and range lines 118 have their images appearing at 182. It is noted that line 178 is within elevation area 114, represented at 184 while cursor line 180 appears on azimuth area 110 shown at 186. Ground clutter 116 and 112 is depicted on areas 184 and 186 respectively as at 188 and 190. The target is shown at 192 and 194 and is produced by patches 124 and 126.

Manifestly, as the plate 56 scans the areas 110 and 114 as well as the moving targets 124 and 126, the luminous coatings will continually change in brilliance from the brightest condition progressively toward a dim condition and vice versa. The images of range lines 182, areas 184 and 186, patterns 188 and 190, as well as the targets 192 and 194 will fade and become brighter as the scanning base lines created by oscillating slots 64 and 66 pass across the simulated scope and across cursor lines 178 and 180.

The student may work in conjunction with an instructor and, through use of airplane training apparatus including crab 132, with a student pilot, thereby learning to guide a plane to a theoretical point of touchdown at the end of the simulated runway near the apex of the scope. The instructor moves the shaft 134, utilizing pointer 148 and dial 152 to correspond with altimeter readings on control desk 132 whereby to move elevational target 124 and to produce descent in the aircraft. Directional movement is controlled automatically by crab 128. The electronically controlled lines or pips of light produced by the radar cathode-ray tube and other actual operating conditions are therefore, portrayed to the student in a realistic manner as is desired.

Surveillance or plan position indicator (P. P. I.) presentation is simulated through use of the modification shown in Figs. 13 to 22 inclusive. A cabinet 200 (Figs. 13-15) has an inclined front wall 202 and a lid 204 hingedly mounted on a horizontal wall 206, forming a chamber 208.

An electric motor 212 is mounted on a horizontal partition 210 and a shaft 214 driven by motor 212 rotates an opaque, inclined scanning plate 220 through a shaft 224 fixed to a hub 232. A bearing 226 for shaft 224 is affixed to partition 210 and the bottom face of plate 220 is mounted directly on spaced legs 230 on the hub 232 (see also Fig. 19.)

Electrical slip rings 234 on hub 232 are coupled with an elongated black light or ultra-violet ray lamp 240 passing between legs 230 of hub 232 and secured to the bottom face of plate 220. Accordingly, plate 220, lamp 240, hub 232, shaft 224 and rings 234 rotate together as a unit when motor 212 is energized. Electrical brushes 244 slidably engage the slip rings 234 to complete the circuit and are held biased thereagainst by a resilient bracket 248 on bearing 226.

Circular plate 230 is provided with a sector-shaped aperture 242 defined by a radial edge 243 parallel with lamp 240, a second radial edge 245 perpendicular to edge 243 and an interconnecting arcuate edge 247 concentric with the periphery of plate 220. (Figs. 15 and 19.) An elongated, luminescent strip 252 of plastic or the like is affixed to edge 243 and extends outwardly from aperture 242 into partial overlapping relationship to lamp 240. For purposes hereinafter made clear, plate 220 absorbs radiations from lamp 240 and produces a visible light.

An opaque deflector panel 254, having the peripheral configuration of aperture 242, has its curved edge secured to the uppermost face of plate 220 along the edge 247 of aperture 242. Panel 254 extends through aperture 242 and is curved over lamp 240 on one side of hub 232. An opaque strip 255 on the bottom face of plate 220 closes panel 254 in opposed relationship to strip 252 and parallel with the latter.

A circular holder 256 parallel with plate 220 and spaced from the upper face thereof, has three circular openings 272 therein having their axes in a pattern concentric with the axis of holder 256. (Figs. 13, 15, 16 and 19.) Each opening 272 respectively, is provided with a circular range presentation screen 277 in the form of a disc of translucent material having patterns thereon representing ground clutter, obstructions and the like 279, together with range lines 281. Screens 277 may vary to present differing simulated areas of use, scope of coverage, etc., and are removably mounted in openings 272 in any suitable manner to permit ready changing as desired. The aforesaid patterns 279 and 281 are formed by use of phosphorescent and fluorescent paint on one face of discs 277. Holder 256 is mounted on one end of a shaft 258 passing through a wall 276 that is parallel with and spaced above holder 256.

Shaft 258 rotates in a bearing 260 secured to partition 210 and is driven through crank 262 coupling with shaft 258 in gear box 266. (Fig. 13.) Discs 268 and 270 on bearing 260 and shaft 258 respectively have interlocking teeth on the proximal faces thereof, disc 270 being slidable but nonrotatable on shaft 258. A spring 274 coiled on shaft 258 is interposed between wall 276 and disc 270 to yieldably hold discs 268 and 270 together.

Thus, by turning crank 262, any one of the openings 272 can be positioned in coaxial alignment with plate 220 and with a hole 273 in wall 276.

An annular groove 297 surrounding hole 273 (Figs. 16, 20 and 21), rotatably receives a navigating head ring 278 and a stationary declination indicating arc 280 is embedded within wall 276. Ring 278 may be adjusted with respect to arc 280 to the position that will allow the reading thereof to include the magnetic compass deviation from true north at the particular location where the instrument is placed in use. Both arc 280 and ring 278 are formed from transparent material and calibrated with transverse score lines that are in turn lighted by a number of lamps 282 embedded within wall 276. Lamps 282 are disposed to direct rays of light radially into ring 278. Any suitable means (not shown) may be provided to releasably hold ring 278 in a set position with respect to arc 280.

A lamp unit 284 (Figs. 13 and 15) located in compartment 208 and carried by conduit 286 contains a lamp and lens assembly of conventional character which directs a concentrated beam of light of small diameter in a downward direction, said lamp being energized from a low voltage power supply or a small dry battery (not shown).

A Link Trainer crab 288 (Fig. 13) carries conduit 286 for imparting motion to lamp unit 284 coincident with the movement of crab 288 on Link Trainer desk 290.

A target light intensity control scanner disc 292 (Figs. 13, 14, 15 and 22) is disposed for rotation within a plurality of brackets 294 each having a pair of opposed guide rollers 296 and a roller 298 for the periphery of disc 292 that allow scanner 292 to rotate in a smooth manner with a minimum of friction. A groove in the periphery of scanner disc 292 receives a belt 300 which passes over pulleys 302, mounted in partition 206, and engages a similar groove in scanner plate 220. The diameters of scanner disc 292 and scanner plate 220 are equal, allowing the maintenance of synchronization. The circular scanner disc 292 has a number of segmental areas 304 (Fig. 14) of varying degrees of translucency with the result that as the scanner disc 292 rotates, the amount of light emanating from lamp unit 284 thereabove that passes through disc 292 is gradually reduced to a minimum and instantaneously increased to a maximum. In other words, one of the areas 304 is fully or at least substantially transparent with adjacent areas 304 progressively decreasing in transparency counter to the direction of rotation of disc 292. Areas 304 may be produced in any suitable manner such as painted coatings, thin sheets of material glued to disc 292, or use of separate segments interconnected to form disc 292.

A clear plastic plate 306 is located below the scanner disc 292 and spaced therefrom and has a coating of phosphorescent and fluorescent paint on its upper surface, the light from the lamp unit 284 above energizing the paint and causing it to glow.

A transparent, circular tracking grid plate 308 (Figs. 17, 18 and 22) is mounted flush with the top of partition 206 immediately beneath plate 306 and spaced therefrom and has parallel tracking range lines 310 and transverse range marks 311, scored in the upper surface thereof. Plate 308 is rotated by a cable 312 which engages a groove in the periphery of said plate 308 and is driven by a sheave 314 affixed to a flexible shaft 316 extending through the wall 202 where it terminates in a crank 318. Rollers 320 position the plate 308 and hold the same for rotation about its center.

Lamps 322 submerged in wall 206 as shown in Fig. 17, illuminate the scored lines 310 and 311, the illumination of lamps 282 and 322 being regulated at will by operation of rheostats (not shown).

The image coming from the assembly just described and within compartment 208 passes through an opening 324 in partition 206 and falls on a half-silvered mirror 326 which is disposed between partition 206 and wall 276 at substantially equal angles with each and is reflected through an opening 328 in wall 202 of the cabinet 200. In other words, mirror 326 bisects the acute angle defined by walls 206 and 276. The image from one of the range presentation screens 277 passes through the half silvered mirror 326 to the opening 328 and thus the two images appear to be merged in the simulated representation.

In operation, with energy provided to motor 212, scanner plate 220 rotates at a preferable speed of approximately 30 revolutions per minute and scanner disc 292, being driven by belt 300 rotates at the same speed and in synchronization with disc 220. The beam of light from lamp unit 284 moves about on the upper scanning disc 292 as positioned by the Link Trainer crab 288 and energizes a spot on the coated surface of the plate 306 which produces a spot of light that travels through the tracking grid plate 308 and is reflected by the mirror 326 to the observer. The tracking grid plate 308 may be rotated to align any one of the parallel lines 310 with the direction of travel, whereupon the magnetic heading of the simulated target may be determined by reading the azimuth at the point designated by an arrow 330. The lighting for the lines 310 and 311 may be varied or turned off as desired by the trainee for optimum results.

The holder 256 is positioned as desired to place one of the three available screens 277 in register with the rear scanning plate 220. The black light source 240 on the scanner plate 220 energizes the luminescent coatings of the range patterns 279 and 281 of screen 277 in a manner simulating the scanning beam of an actual radar scope wherein the brilliance of a spot on the screen increases instantaneously and decays until it is substantially 50% of the original brilliance.

The navigation ring 278 surrounding the range pattern is positioned to adjust the directional indication to that required by the deviation of the magnetic north from true north at the particular geographic location being simulated by the range pattern. A reading made at the point of the arrow 330 on the center line 310 of the tracking grids 311 with direction of target travel will be the magnetic heading of the target being followed. Control of the lighting to the navigation ring 278 is available for reducing the intensity or darkening the same entirely.

The patterns from both assemblies appear to merge by virtue of the half-silvered mirror 326 wherein one image is reflected by and the other passes through mirror 326. Thus, a radar scope range presentation is simulated with a moving target or targets as desired which may be introduced or controlled as required by the training program on a presentation ground which may be selected and changed at will. In Fig. 23 a representation is shown as it appears to the observer in which a line 332 is produced by the light from the luminescent strip 252 on the rear scanner 220. A target 334 results from the energization of the luminescent material on plate 306 by the light from lamp unit 284 and moves as determined by the external positioning means 288. The stationary patterns 336 and 338 representing ground clutter and range lines respectively are selected and introduced into the image by energizing one of the luminescent screens 277 with ultra-violet light carefully controlled and scanned to produce the changes in intensity for a true simulation of the radar scope representation.

Having thus described the invention, what is claimed as new and desired to be secured by Letters Patent is:

1. In a device for training in the use of radio detection and ranging apparatus capable of producing a cathode-ray tube screen presentation, said device including a viewing panel; structure on one side of said panel and formed into patterns simulating in combination a portion of the presentation of said apparatus, at least one of said patterns being movable in imitation of a moving target displayed by said presentation; means for projecting the images of all of the patterns of said structure in superimposed relationship upon said panel; means for producing at least one image of a line on said panel in superimposed relationship to said pattern images, whereby to display a representation of a bearing cursor of said presentation; and mechanism for varying the position of said image of a line on said panel.

2. In a device for training in the use of radio detection and ranging apparatus capable of producing cathode ray tube screen presentations, said device comprising means for producing an elongated constant beam of light; means for moving said beam of light along a predetermined path of travel; stationary structure having a pattern thereon of luminescent material representing range lines, ground clutter and the like, said pattern being within the path of travel of said beam of light; shiftable apparatus having a figure thereon of luminescent material representing a target, said figure being movable into the path of travel of said beam of light upon shifting of said apparatus; and an element for reflecting images of both the pattern and the figure when the same are illuminated by the beam of light, said element being disposed to picture relative movement of the figure and pattern.

3. In a device for training in the use of radio detection and ranging apparatus capable of producing cathode ray tube screen presentations, said device comprising a scanner plate having a slot therein; a lamp mounted on one face of the plate for directing rays of light through the slot, said plate being shiftable for moving the beam of light emanating from the slot along a predetermined path of travel; stationary structure having a pattern thereon of luminescent material representing range lines, ground clutter and the like, said pattern being within the path of travel of said beam of light; shiftable apparatus having a figure thereon of luminescent material representing a target, said figure being movable into the path of travel of said beam of light upon shifting of said apparatus; and an element for reflecting images of both the pattern and the figure when the same are illuminated by the beam of light, said element being disposed to picture relative movement of the figure and pattern.

4. In a device for training in the use of radio detection and ranging apparatus capable of producing cathode ray tube screen presentations, said device comprising means for producing an elongated constant beam of light; means for moving said beam of light along a predetermined path of travel; stationary structure having a pattern thereon of luminescent material representing range lines, ground clutter and the like, said pattern being within the path of travel of said beam of light; a reciprocable support; a member mounted on the support for reciprocation with respect thereto along a path of travel intersecting the path of travel of the support, said member having a figure thereon of luminescent material representing a target, said figure being movable into the path of travel of said beam of light upon movement of the member; and an element for reflecting images of both the pattern and the figure when the same are illuminated by the beam of light, said element being disposed to picture relative movement of the figure and pattern.

5. In a device for training in the use of radio detection and ranging apparatus capable of producing cathode ray tube screen presentations, said device comprising means for producing an elongated constant beam of light; means for moving said beam of light along a predetermined path of travel; stationary structure having a pattern thereon of luminescent material representing range lines, ground clutter and the like, said pattern being within the path of travel of said beam of light; shiftable apparatus having a figure thereon of luminescent material representing a target, said figure being movable into the path of travel of said beam of light upon shifting of said apparatus; an illuminable member having means for producing light rays representative of a cursor line; and an element for reflecting images of both the pattern and the figure when the same are illuminated by the beam of light and for reflecting said rays of light, said element being disposed to picture movement of the figure relative to the pattern and the cursor line.

6. In a device for training in the use of radio detection and ranging apparatus capable of producing cathode ray tube screen presentations, said device comprising means for producing an elongated constant beam of light; means for moving said beam of light along a predetermined path of travel; stationary structure having a pattern thereon of luminescent material representing range lines, ground clutter and the like, said pattern being within the path of travel of said beam of light; shiftable apparatus having a pair of figures thereon of luminescent material representing a target, said figures being movable into the path of travel of said beam of light upon shifting of said apparatus; a pair of spaced illuminable members each having means for producing light rays representative of a cursor line; and an element for reflecting images of the pattern and both figures when the same are illuminated by the beam of light and for reflecting the rays of light of both members, said element being disposed to picture movement of both figures relative to the pattern and movement of each figure relative to a corresponding cursor line.

7. In a device for training in the use of radio detection and ranging apparatus capable of producing cathode ray tube screen presentations, said device comprising means for producing an elongated constant beam of light; means for moving said beam of light along a predetermined path of travel; stationary structure having a pattern thereon of luminescent material representing range lines, ground clutter and the like, said pattern being within the path of travel of said beam of light; shiftable apparatus having a pair of relatively movable figures thereon of luminescent material representing a target, said figures being movable into the path of travel of said beam of light upon shifting of said apparatus; a pair of spaced illuminable members each having means for producing light rays representative of a cursor line; and an element for reflecting images of the pattern and both figures when the same are illuminated by the beam of light and for reflecting the rays of light of both members, said element being disposed to picture movement of both figures relative to the pattern, movement of each figure relative to a corresponding cursor line, and relative movement of the figures.

8. In a machine for training in the use of radio detection and ranging apparatus capable of producing cathode ray tube screen presentations, said device comprising means for producing an elongated, constant beam of light; means for moving said beam of light along a predetermined path of travel; stationary structure having a pattern thereon of luminescent material representing range lines, ground clutter, and the like, said pattern being within the path of travel of said beam of light; a reciprocable support; a member mounted on the support for reciprocation therewith; a second member mounted on the support for reciprocation with respect thereto along a path of travel intersecting the path of travel of the support, said members each having a figure thereon of luminescent material representing a target, said figures being movable into the path of travel of said beam of light upon movement of the members; a pair of spaced illuminable devices each having means for producing light rays representative of a cursor line; and an element for reflecting images of the pattern and both figures when the same are illuminated by the beam of light and for reflecting the rays of light of both devices, said element being disposed to picture movement of both figures relative to the pattern, movement of each figure relative to a corresponding cursor line, and relative movement of the figures.

9. In a device for training in the use of radio detection and ranging apparatus capable of producing cathode ray tube screen presentations, said device comprising a swingable scanner plate having a slot therein; a lamp mounted on one face of the plate for directing rays of light through the slot; means for oscillating the plate to move the beam of light emanating from the slot along a sweeping path of travel; stationary structure having a pattern thereon of luminescent material representing range lines, ground clutter and the like, said pattern being within the path of travel of said beam of light; shiftable apparatus having a figure thereon of luminescent material representing a target, said figure being movable into the path of travel of said beam of light upon shifting of said apparatus; and an element for reflecting images of both the pattern and the figure when the same are illuminated by the beam of light, said element being disposed to picture relative movement of the figure and pattern.

10. In a machine for training in the use of radio detection and ranging apparatus capable of producing cathode ray tube screen presentations, said machine comprising a swingable scanner plate having a pair of spaced slots therein; a lamp for each slot respectively, said lamps being mounted on one face of the plate for directing rays of light through the corresponding slots; means for oscillating the plate to move the beams of light emanating from the slots along a sweeping path of travel; stationary structure having a pattern thereon of luminescent material representing range lines, ground clutter and the like, said pattern being within the path of travel of said beams of light; a reciprocable support; a member mounted on the support for reciprocation therewith; a second member mounted on the support for reciprocation with respect thereto along a path of travel intersecting the path of travel of the support, said members each having a figure thereon, each figure corresponding to a beam of light and being of luminescent material representing a target, the figures being movable into the path of travel of said beams of light upon movement of the members; an illuminable device for each figure respectively, each having means for producing light rays representative of a cursor line; and an element for reflecting images of the pattern and both figures when the same are illuminated by the beam of light and for reflecting the rays of light of both devices, said element being disposed to picture movement of both figures relative to the pattern, movement of each figure relative to a corresponding cursor line, relative movement of the figures and sweeping movement of both beams of light.

11. In a machine for training in the use of radio detection and ranging apparatus capable of producing cathode ray tube screen presentations, said machine comprising a transparent panel having opaque portions presenting an elevation area and an azimuth area; a second transparent panel having luminescent lines overlying the said areas representing range lines and having patterns for each area respectively of luminescent material representing ground clutter; a swingable scanner plate having a slot therein for each area respectively; a lamp for each slot respectively, said lamps being mounted on one face of the plate for directing rays of light through the corresponding slots; means for oscillating the plate to move the beams of light emanating from the slots along a sweeping path of travel, said areas, said luminescent lines and said patterns being within the path of travel of said beams of light; a reciprocable support; a member mounted on the support for reciprocation therewith; a second member mounted on the support for reciprocation with respect thereto along a path of travel intersecting the path of travel of the support, said members each having a figure thereon, each figure corresponding to one of said areas and being of luminescent material representing a target, the figures being movable into the path of travel of said beams of light upon movement of the members; an illuminable device for each of said areas respectively, each device having means for producing light rays representative of a cursor line; and an element for reflecting images of the range lines, the ground clutter of each area respectively, the cursor line of each area respectively and both of said figures whereby to picture both elevational and azimuth movement of said target with respect to the cursor lines, the range lines and the ground clutter of said areas.

HUBERT A. AMMAN.

REFERENCES CITED

The following references are of record in the file of this patent:

UNITED STATES PATENTS

| Number | Name | Date |
|---|---|---|
| 2,016,151 | Levene | Oct. 1, 1935 |
| 2,443,631 | McDermott | June 22, 1948 |
| 2,470,912 | Best | May 24, 1949 |
| 2,491,308 | Gorton | Dec. 13, 1949 |
| 2,505,094 | Bunyan | Apr. 25, 1950 |
| 2,505,793 | Rust et al. | May 2, 1950 |
| 2,524,847 | Springer | Oct. 10, 1950 |